United States Patent [19]

Berg et al.

[11] 4,050,068
[45] Sept. 20, 1977

[54] AUGMENTED TRACKING SYSTEM

[75] Inventors: Robert L. Berg, St. Louis; William J. Murphy, Frontenac; Dennis E. Simmons, Jr., Bridgeton, all of Mo.

[73] Assignee: The United States of America as represented by the Secretary of the Air Force, Washington, D.C.

[21] Appl. No.: 667,041

[22] Filed: Mar. 15, 1976

[51] Int. Cl.² ............................................. G01S 9/02
[52] U.S. Cl. ................................................ 343/6 R
[58] Field of Search ............... 343/6 R, 6 ND, 6 TV, 343/9; 244/3.20

[56] References Cited

U.S. PATENT DOCUMENTS

| | | |
|---|---|---|
| 3,053,932 | 9/1962 | Worst .............................. 343/6 R X |
| 3,076,961 | 2/1963 | Bibbero ............................. 343/6 R |
| 3,261,014 | 7/1966 | Diaz ................................ 343/6 R |
| 3,300,777 | 1/1967 | Tarr ................................ 343/6 R |
| 3,432,856 | 3/1969 | Buell et al. ......................... 343/9 |
| 3,920,199 | 11/1975 | Woodworth et al. ............. 244/3.20 |
| 3,924,232 | 12/1975 | Burdi et al. ....................... 343/6 R |
| 3,934,250 | 1/1976 | Martin, Jr. .................... 343/6 TV X |

Primary Examiner—T.H. Tubbesing
Attorney, Agent, or Firm—Joseph E. Rusz; William Stepanishen

[57] ABSTRACT

An augmented tracking apparatus utilizing an optical tracker in conjunction with a radar sensor to lock on to and track a moving target aircraft.

5 Claims, 4 Drawing Figures

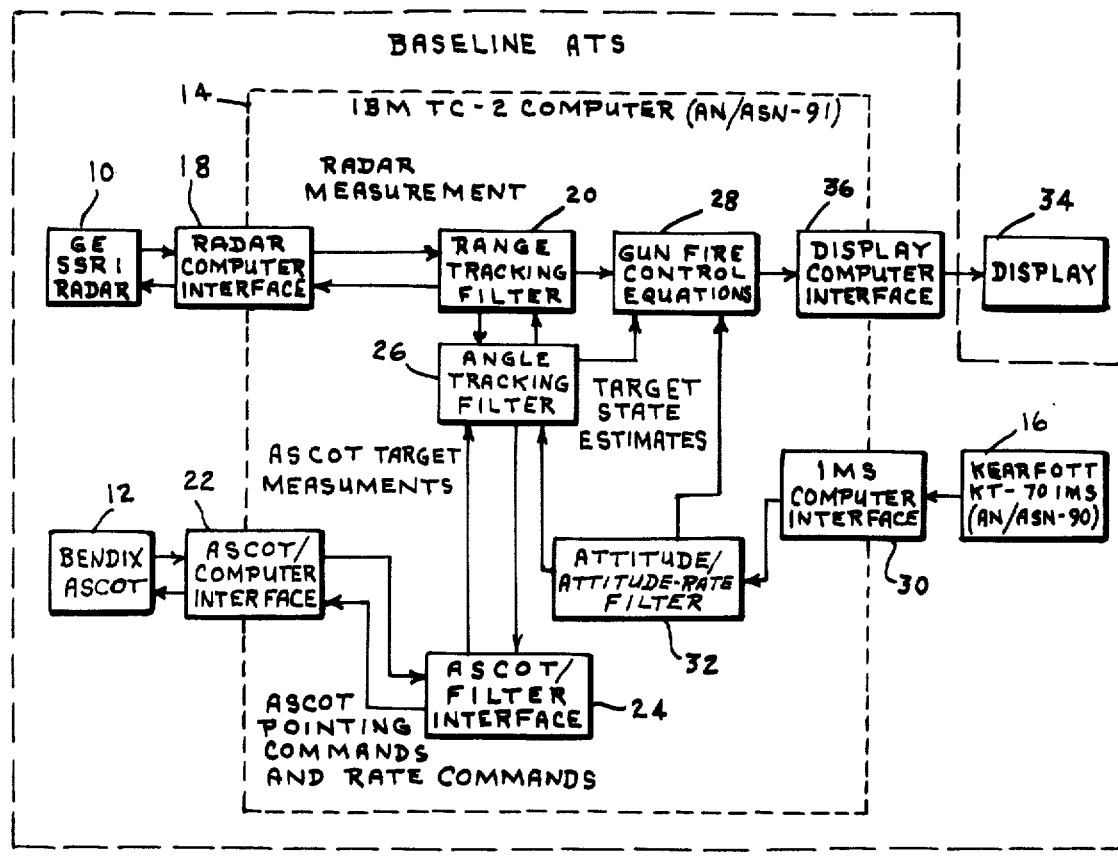
FIG. 1
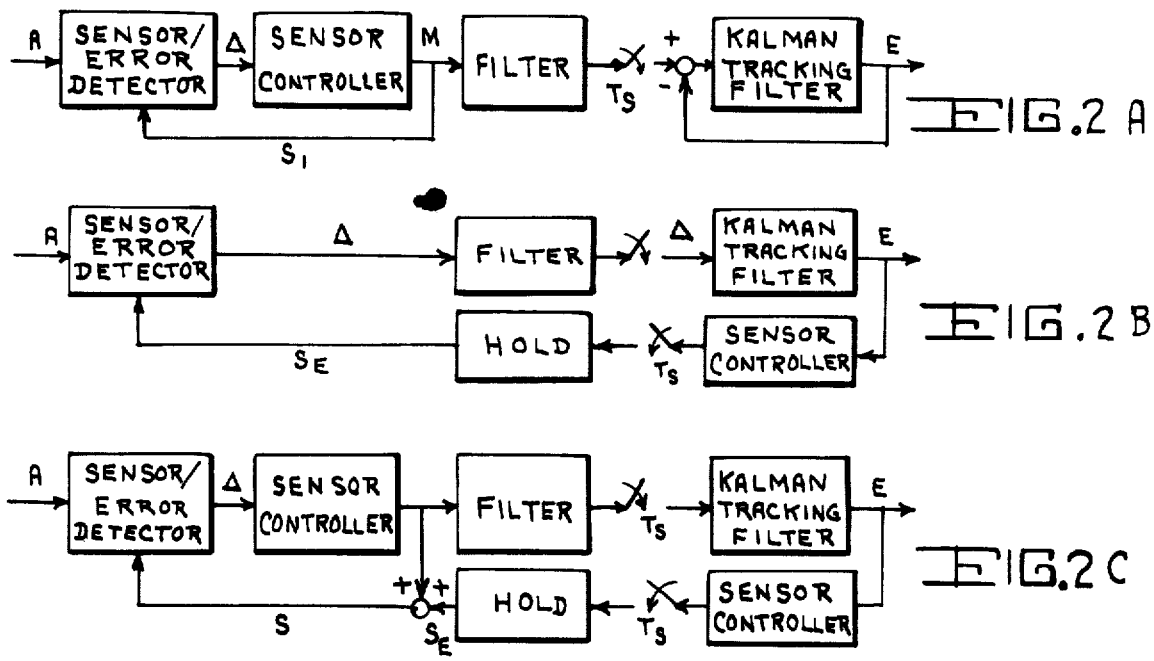
FIG. 2A
FIG. 2B
FIG. 2C

AUGMENTED TRACKING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to tracking systems, and in particular to an augmented tracking apparatus for tracking and predicting the future position of a moving aircraft.

In the prior art, it is well known that tracking accuracy in air-to-air operation deteriorates under stress of combat when distured systems are used, because of the basic mechanization which employs aircraft body rates in the lead angle computation and is a function of the pilot-airframe response. The director systems, in which all computations are made in terms of the existing line of sight rates available from the attacking plane is target tracking instrumentation, is less influenced by the dynamics of the pilot and the airframe.

In the prior art, director systems employed gimballed sensors wherein the gimbal servo noise degraded system performance. Director systems also employed Radar angle trackers wherein Radar tracking noise degraded system performance. Principally because of system lags associated with filtering the gimbal servo and Radar tracking noise, the steering accuracies of prior-art director systems are not as improved over disturbed systems as might be expected.

SUMMARY

The present invention utilizes strapdown electro-optical and radar sensors in conjunction with advanced Kalman filtering in a roll-stabilized coordinate system. The electro-optical sensor operates on a non-imaging tracking principle which is simpler than conventional imaging systems. While strapdown sensors' total fields of view are not as large as those of gimballed sensors, an effective increase in field of view is achieved by employing extrapolate modes in the tracking filter. Where required, an increased field of view is achieved by the use of multiple sensors with slightly overlapping individual fields-of-view and appropriate hand-off logic in the tracking filter equations.

It is one object of the present invention, therefore, to provide an improved tracking apparatus utilizing strapdown non-imaging electro-optical sensors which require no gimbal and no data storage prior to error processing.

It is another object of the invention to provide an improved tracking apparatus which has higher tracking loop data rates resulting in reduced lock-on times and increased maintain-lock capability.

It is yet another object of the invention to provide an improved tracking apparatus in which the electro-optical image centroid more closely matches the target center of gravity than does the image of an IR sensor.

It is still another object of the invention to provide an improved tracking apparatus utilizing electro-optical sensors requiring a smaller entrance apperture which increases its installation flexibility and reduces the aerodynamic drag penalty.

These and other advantages, features and objects of the invention will become more apparent from the following description taken in connection with the illustrative embodiment in the accompanying drawings.

BRIEF DESCRIPTION OF THE DRAWINGS

FIG. 1 is a block diagram of the augmented tracking apparatus in accordance with the present invention, and FIGS. 2a-c are block diagrams of the alternative principal sensor/Kalman filter configurations.

DESCRIPTION OF THE PREFERRED EMBODIMENT

Referring now to FIG. 1, there is shown an augmented tracking apparatus comprised of four principal subsystems, a radar unit 10, an optical tracker 12, a digital computer unit 14 and an inertial platform 16. These principal subsystems may be implemented as follows:

radar unit 10 — G.E. SSR-1 Radar optical tracker 12 — Bendix Adaptive Scan Centroid Optical Tracker (ASCOT)

digital computer unit 14 — IBM TC-2 (AN/ASN-91) Digital Computer inertial platform 16 - Kearfott KT-70 (AN/ASN-90) Interial Platform.

The digital computer 14 receives initial data from the radar 10, optical tracker 12 and the inertial platform 16 which is processed within the computer 14 to provide the commands and displays required to perform an assigned mission. The radar 10 is connected by radar-computer interface unit 18 to provide range tracking data to range tracking filter 20. The optical tracker is connected by ASCOT/computer interface 22 and AS-COT/filter filter interface 24 to angle tracking filter 26 to provide optical tracking target data thereto. The range tracking filter 20 is connected to both the gun fire control equations unit 28 and the angle tracking filter 26. The inertial platform 16 is connected by Inertial Measurement System (IMS)-computer interface 30 to the attitude/attitude-rate filter 32 to provide attitude and attitude-rate date thereto. The attitude-attitude rate filter 32 is connected to the angle tracking filter 26 which provides target state estimates to the gun fire control equations unit 28. A display unit 34 is connected by display computer interface 36 to the gunfire control equations unit 28.

The present augmented optical tracker apparatus functions in gunnery situations in which the attacking pilot successfully accomplishes the acquisition phase without assistance from the fire control system, and has the target in the general field of view applicable to gunfire with a fixed gun. Up to this time, his sight display would be that of a damped predictive tracer (DPT), with no measured-range designator. Upon achieving this encounter geometry situation which is within the field of view of the range sensor, measured range will be automatically obtained and a corresponding designator or reticle added to the tracer. If range lock-on is not achieved, the pilot would attempt a gunnery pass with a non-range DPT sight. Assuming range-lock-on, his task becomes that of bringing the target into coincidence with the reticle, employing it as he would a lead computing optical sight, LCOS, (i.e., firing an estimated time-of-flight ahead of target/reticle coincidence). At the same time, after range lock-on occurs, the angle tracker 26 will begin its search mode centered on the DPT sight reticle.

When the target moves into the search field of the angle tracker 26, the angle tracker 26 locks on, converts to its tracking mode, and supplies data necessary to perform a director sight reticle computation. When the director reticle becomes available, the DPT line is removed and the director reticle blended with the DPT reticle until the display transitions to an all-director sight. During the transition from DPT to director, the pilot also transitions from a DPT steering technique (i.e., bringing the target and reticle slowly through successive coincidences, and attempting to decrease the amplitude of the excursions with each tracking cycle) to a director steering technique by bringing the target and reticle into coincidence and attempting to maintain a tracking situation. During this transition, the pilot's firing logic will be a blend of those applicable to an LCOS and a director sight. After the transition, the pilot employs the sight as a director, firing at the time of target/reticle coincidence. It may be noted that the present tracking apparatus primarily is comprised of a strapdown optical tracker 12 and radar unit 10, a digital computer 14 and an inertial platform 16. In its present operation, a strapdown rate gyro package could be substituted for the inertial platform since only ownship body rates are required for tracker operation.

There is shown in FIGS. 2 a-c a tracker configuration in which the optical tracker and radar unit may be interfaced with the Kalman tracking filter. The two more common sensor/filter interface methods are illustrated in FIG. 2(A) and (B), while the augmented tracker interface configuration is shown as FIG. 2(C). Two of the most significant advantages of the configuration of FIG. 2(C) are: 1) it provides a Kalman-filtered reference pointing command for the instantaneous sensor field of view; and 2) it provides an internal, high data-rate vernier pointing command for tight sensor-loop closure.

In the present invention, the use of a rectilinear tracking filter is particularly well suited for use in conjunction with the strapdown optical tracker sensor due to the close correspondence between the filter and sensor coordinate systems. Filtering is accomplished in a roll-stabilized plane orthogonal to the estimated line-of-sight. Two independent filters are utilized: one for vertical motion in the filter plane and one for horizontal motion. The filter states correspond to the rectilinear position, velocity and acceleration of the target in the filter plane.

The tracking filter pointing commands are provided to the optical tracker from the digital computer 14. In order to provide continuous pointing commands, both the ASCOT pointing commands and rate commands are generated in the digital computer 14. The ASCOT 12, in turn, provides pointing error signals in sensor coordinates, and a track enable discrete, to the digital computer.

During initial lock-on, the ASCOT 12 function in its normal mode of operation with tracker pointing commands specifying the initial search field. After target detection, the track enable discrete is used as a cue to initialize the tracking filter.

After initialization, updated tracker pointing commands are generated and transmitted to the ASCOT 12. Initially, the Kalman filter gains are large: thereby, quickly incorporating the initial measurements into its target state estimates. After about 2 seconds, these gains diminish to their steady state values, changing only as a function of estimated range and range rate. If the ASCOT 12 should experience a break-lock or attempt to follow a spurious target, the tracking filter pointing (i.e., position and position-rate) commands will force it to the predicted target line of sight. When it fails to sense a signal in the commanded direction, the ASCOT 12 will revert to its fine search mode; that is, scan a preselected area about the predicted target position. This process continuously provides smooth values of the target state variables as well as a smooth transition from track-to-search-to-track during breaklock situations.

It is well known that strapdown angle/angle-rate sensors have a limited field of view. However, since the position of the target relative to the sensor is known in the digital computer, the imminent loss of lock due to the target escaping the ASCOT field of view can be anticipated prior to its occurence. In this event, the filter automatically enters its extrapolate mode and commands the ASCOT search field of view to that extremity of the total field of view where the target is expected to reenter due to pilot control of the aircraft. This significantly speeds the reacquire process. If the ASCOT does not enable its track mode in a pre-established time after the predicted target is within the field of view, the ASCOT is commanded to revert to its acquire mode and the Kalman filter is reinitialized.

The equations of both the vertical and horizontal rectilinear tracking filter are similar and both filters utilize range and range-rate estimates. The state variables of each angle tracking filter are the respective components of: pointing error, relative target velocity, and target acceleration normal to the line-of-sight. All variables are estimated in roll-stabilized, line-of-sight coordinates. Filter symmetry results in equal Kalman gains, $K_a$, for both filters. The Kalman gains are computed in real time to account for changing target range and range rate. External signals to each angle tracking filter consist in the respective components of: body coordinate axis rates and attacker accelerations transformed into filter coordinates, and measured sensor pointing errors.

The measured pointing errors used are the respective components of the pointing error as measured in the roll-stabilized, line-of-sight coordinate system. The pointing error components are computed primarily from the ASCOT pointing error measurement, which are voltages related to the location of the target image in the focal plane of the ASCOT optical system. The pointing error computation also involves a coordinate transformation which transforms the ASCOT measurements onto a roll-stabilized plane orthogonal to the estimated line-of-sight. Measurements from the ASCOT and the attacker aircraft are taken at a high (100 Hz) data rate and are used to compute pointing errors in the filter coordinates (every 0.01 second). Several (five) samples of these pointing errors are averaged to provide smoothed measurements to the Kalman filter which operates at a slower rate (0.05 seconds).

The range state variables are: range, range rate, and acceleration along the line-of-sight. External signals to the filter are measured range and attacker acceleration along the line-of-sight. The range filter utilizes the rotational rates of the filter coordinate system in its dynamic model. The Kalman gains, $K_R$, are computed in real time, taking into account the changing filter rates.

Measured range is provided by smoothed samples of range data from the SSR-1 range register. Each range measurement to the Kalman filter is the result of five radar range measurements taken at 0.01 second intervals. The residual is computed by differencing the range and the estimated range measurement. The updated range filter state vector is obtained by summing the predicted state, the aiding signals and the residual multiplied by the 3 × 1 Kalman gain vector. This process is repeated every 0.05 second taking into account any change in the estimated target LOS rates.

Although the invention has been described with reference to a particular embodiment, it will be understood to those skilled in the art that the invention is capable of a variety of alternative embodiments within the spirit and scope of the appended claims.

What is claimed is:

1. An augmented tracking apparatus comprising in combination a radar sensor to provide range data
   an electro-optical sensor to provide angle data
   an inertial platform to provide inertial frame of reference data, said inertial platform sensing any change in aircraft attitude from said inertial frame of reference and providing attitude data corresponding to said change, and,
   a computing means connected to said radar sensor and said electro-critical sensor to respectively receive said range data and said angle data, said computing means connected to said inertial platform to receive said inertial frame of reference data and said attitude data, said computing means processing said range, angle and attitude data to provide target state data, said computing means providing pointing commands to said electro-optical sensor, said electro-optical sensor responding to said pointing commands to scan a preselected area about the predicted target position said electro-optical sensor being a non-imaging electro-optical sensor.

2. An augmented tracking apparatus as described in claim 1 wherein said computing means comprises a digital computer, said digital computer being an IBM TC-2 computer.

3. An augmented tracking apparatus as described in claim 1 wherein said radar sensor comprises a radar unit, said radar unit being a G.E. SSR-1 radar.

4. An augmented tracking apparatus as described in claim 1 wherein said inertial platform comprises a Kearfott KT-70 inertial platform.

5. An augmented tracking apparatus as described in claim 1 wherein said non-imaging electro-optical sensor is an optical tracker, said optical tracker being a Bendix ASCOT.

* * * * *